W. Brown,
Tanning Apparatus,
Nº 1,079.   Patented Feb. 9, 1839.
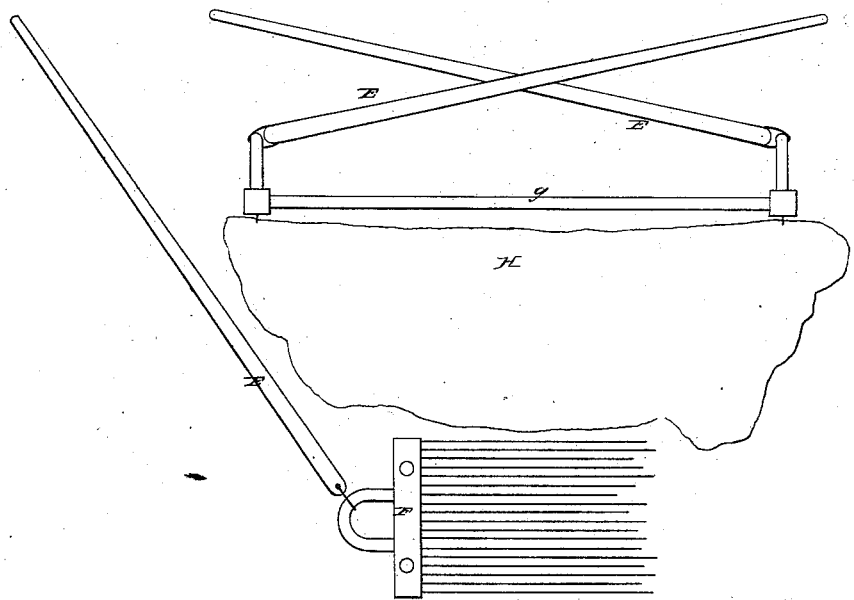
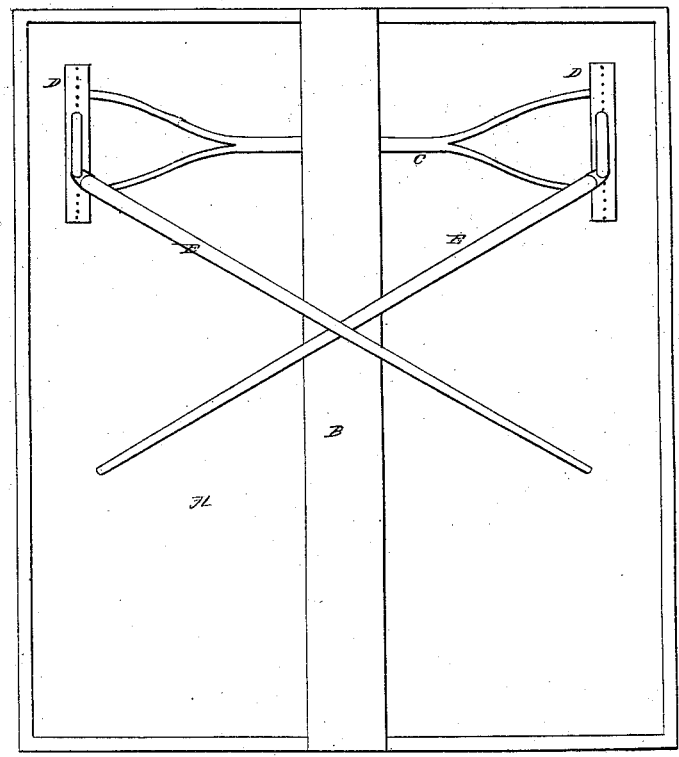

UNITED STATES PATENT OFFICE.

WILLIAM BROWN, OF THOMPSON, NEW YORK.

APPARATUS FOR HANDLING HIDES, &c., IN THE PROCESS OF TANNING LEATHER.

Specification of Letters Patent No. 1,079, dated February 9, 1839.

*To all whom it may concern:*

Be it known that I, WILLIAM BROWN, of Thompson, in the county of Sullivan and State of New York, have invented a new and Improved Mode of Tanning, called "Brown's Facilitating Apparatus for Tanning."

The nature of my invention consists in changing the position of hides, sides, and skins in the liquors in all the different processes of tanning, viz., liming, bating and tanning, as a substitute for the ordinary mode of drawing, handling, and laying away.

To enable others skilled in the art of tanning to make and use my invention, I proceed to describe its construction and operation, I construct my vats in any of the known forms as seen at A, in the accompanying drawing with the addition of the plank B across the vat A, and apply thereto an apparatus partially in the form of a rake, as exhibited by the heads D, handles E and stretcher C, a bow is attached to the head D, to which the handle E is affixed by a leather strap that they may be at liberty to cross each other over the plank B. The object of the stretcher C is to keep the heads D extended and its length is regulated by the length of the hides, sides or skins. The hides, &c., is attached to the heads D, by means of holes bored in the same about one inch apart through which a strap passes into corresponding holes made in the edge of the hides, &c. The number of hides, sides, or skins attached to each set of apparatus may be varied from 10 to 25 to be governed by their weight.

F exhibits end view of apparatus with hides, &c., attached, *g* gives the side view of apparatus with hides, &c., attached, H a side of leather in progression.

The whole being immersed in the liquor as above described, the workman will take the handles E one in each hand moving along the plank B will thereby change the position of the hides, &c., with ease and facility. Moving the sides from one side of the vat to the other changes their position by turning them upside down.

The operation will require about five minutes to remove 100 sides.

By the use of the above apparatus green stock may be kept extended and lie smoothly in the liquor without folds or doublings permitting the liquor to come in contact with, and circulate freely among the leather, enabling the workman to change its position with facility and frequently, which should be done once in ten minutes for the first hour and from four to six times a day afterward which not only facilitates the tanning, but improves the quality of the leather.

What I claim as my invention and desire to secure by Letters Patent is—

The construction of the above described apparatus and its application to vats of any and every description in all the different processes of tanning.

WM. BROWN.

Witnesses:
A. KITCHAM,
ROBT. R. BROWN.